(12) United States Patent
Kim et al.

(10) Patent No.: US 8,067,114 B2
(45) Date of Patent: Nov. 29, 2011

(54) ELECTROLYTE FOR LITHIUM SECONDARY BATTERY OF IMPROVED LOW-TEMPERATURE PROPERTY AND SECONDARY BATTERY CONTAINING THE SAME

(75) Inventors: Bo Hyun Kim, Seoul (KR); Jisang Yu, Daejeon (KR); Sung-Woo Kim, Daejeon (KR); Ra Young Hwang, Seoul (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 877 days.

(21) Appl. No.: 11/559,943

(22) Filed: Nov. 15, 2006

(65) Prior Publication Data

US 2007/0111106 A1    May 17, 2007

(30) Foreign Application Priority Data

Nov. 15, 2005  (KR) .................. 10-2005-0108843

(51) Int. Cl.
*H01M 6/04* (2006.01)
*H01M 4/13* (2010.01)
*H01M 4/60* (2006.01)
*H01M 4/50* (2010.01)

(52) U.S. Cl. .................. 429/188; 429/213; 429/224

(58) Field of Classification Search .................. 429/324
See application file for complete search history.

(56) References Cited

U.S. PATENT DOCUMENTS

| | | |
|---|---|---|
| 4,139,681 A | 2/1979 | Klemann et al. |
| 4,522,901 A | 6/1985 | Shacklette |
| 6,030,720 A | 2/2000 | Chu et al. |
| 2002/0009649 A1* | 1/2002 | Sato et al. .................. 429/306 |
| 2002/0028380 A1* | 3/2002 | Tanjo et al. .................. 429/209 |
| 2004/0146781 A1* | 7/2004 | Ohsawa et al. .................. 429/209 |

FOREIGN PATENT DOCUMENTS

| | | |
|---|---|---|
| EP | 0122381 A1 | 2/1984 |
| JP | 02-239571 | 9/1990 |
| JP | 05-136003 | 6/1993 |
| JP | 05-205745 | 8/1993 |
| JP | 2001-085058 | 3/2001 |
| JP | 2003-257479 | 9/2003 |
| JP | 2005-005153 | 1/2005 |
| WO | 0129919 A1 | 4/2001 |

* cited by examiner

*Primary Examiner* — Barbara L Gilliam
*Assistant Examiner* — Stephan Essex
(74) *Attorney, Agent, or Firm* — Cantor Colburn LLP

(57) ABSTRACT

Provided is a lithium secondary battery which uses a lithium manganese metal oxide as a cathode active material and a non-graphitic carbon material as an anode active material, and based on the total weight of the electrolyte, contains 0.1 to 20% by weight of a salt represented by Formula I in a lithium salt-containing non-aqueous electrolyte:

$$R_4X^+YZ_n^- \qquad (I)$$

wherein R, X, Y, Z and n are as defined in the specification. The lithium secondary battery of the present invention can improve low-temperature properties of the battery by increasing the lithium ion-electrode reactivity and decreasing the electrode-interface resistance, via the formation of a charge double layer at the cathode-anode interface upon charging/discharging of the battery at a low temperature, and therefore can be preferably used in medium/large battery systems such as power sources for electric vehicles (EVs) and hybrid electric vehicles (HEVs) requiring operation under severe conditions.

9 Claims, No Drawings

ELECTROLYTE FOR LITHIUM SECONDARY BATTERY OF IMPROVED LOW-TEMPERATURE PROPERTY AND SECONDARY BATTERY CONTAINING THE SAME

FIELD OF THE INVENTION

The present invention relates to an electrolyte for a lithium secondary battery and a secondary battery containing the same. More specifically, the present invention relates to an electrolyte for a lithium secondary battery which is capable of improving low-temperature properties of the battery by increasing the lithium ion-electrode reactivity and decreasing the electrode-interface resistance, via the formation of a charge double layer at the cathode-anode interface upon charging/discharging of the battery at a low temperature, and is thereby capable of being used in medium/large battery systems as power sources for electric vehicles (EVs) and hybrid electric vehicles (HEVs) forced to be in operation under severe conditions.

BACKGROUND OF THE INVENTION

Technological development and increased demand for mobile equipment have led to a rapid increase in the demand for secondary batteries as an energy source. Among other things, a great deal of research and study has been focused on lithium secondary batteries having a high-energy density and a high-discharge voltage. These lithium secondary batteries are also commercially available and widely used.

Further, increased environmental concern has drawn a great deal of intensive research on electric vehicles (EVs) and hybrid electric vehicles (HEVs) which are capable of replacing fossil-fuel driven vehicles such as gasoline vehicles and diesel vehicles, one of the primary causes of air pollution. Although nickel-hydrogen ($N_1$—$H_2$) batteries are largely employed as power sources for EVs and HEVs, numerous studies have been actively made to use lithium secondary batteries having a high-energy density and a high-discharge voltage, consequently with some commercialization outputs.

In general, the lithium-ion secondary battery uses a carbon material as an anode active material and a metal oxide such as lithium cobalt oxide or lithium manganese oxide as a cathode active material and, and is prepared by disposition of a porous polyolefin separator between the anode and cathode and addition of a non-aqueous electrolyte containing a lithium salt such as $LiPF_6$. Upon charging of the battery, lithium ions exit from the cathode active material and migrate to enter into a carbon layer of the anode. In contrast, upon discharging, lithium ions exit from the carbon layer and migrate to enter into the cathode active material. Here, the non-aqueous electrolyte serves as a medium through which lithium ions migrate between the anode and cathode. Such a non-aqueous electrolyte must be stable in a range of operating voltage of the battery and must have an ability to transfer ions at a sufficiently high rate.

The lithium ion-containing non-aqueous electrolyte may be used in the form of a solution where the lithium salt such as $LiPF_6$, readily soluble in the non-aqueous electrolyte, was dissolved in cyclic carbonate solvents. When such a non-aqueous electrolyte uses only a high-polarity cyclic carbonate capable of sufficiently dissociating lithium ions, this may result in problems associated with an increased viscosity of the electrolyte and thus a decreased ionic conductivity.

Therefore, in order to reduce the viscosity of the non-aqueous electrolyte, techniques of using a mixed electrolyte of linear carbonates having a small polarity but a low viscosity are known in the art. Representative examples of such linear carbonates may include dimethyl carbonate (DMC), diethyl carbonate (DEC) and ethylmethyl carbonate (EMC). Among these materials, EMC having the lowest freezing point of −55° C. exerts superior low-temperature and life performance when it is used. As examples of the cyclic carbonates, mention may be made of ethylene carbonate (EC), propylene carbonate (PC) and butylene carbonate (BC). Inter alia, PC has a low freezing point of −49° C. and thus exerts good low-temperature performance. However, when graphitized carbon having a large volume is used as the anode, PC sharply reacts with the anode during a charging process, and therefore it is difficult to use large amounts of PC. For this reason, EC, which forms a stable protective film at the anode, is primarily used.

As discussed above, in order to reinforce low-temperature performance of the battery, conventional lithium-ion secondary batteries have employed a non-aqueous electrolyte in which $LiPF_6$ salts were mixed in linear or cyclic carbonates and a mixture thereof, by using a low-boiling organic solvent as the organic solvent constituting the non-aqueous electrolyte. The non-aqueous electrolyte having such a composition is known to exhibit the most stable battery properties at both room temperature and high temperature.

However, $LiPF_6$, which is commonly used as the lithium salt in the non-aqueous electrolyte, undergoes lowering of a dissociation degree between Li ions and $PF_6$ anions at a low temperature. Therefore, secondary batteries using $LiPF_6$ as the lithium salt suffer from disadvantages such as a sharp increase of the internal battery resistance and thereby a decreased power output.

On the other hand, when the lithium secondary battery is used in EVs and HEVs, the battery must be operable even under low-temperature conditions such as winter seasons and therefore requires excellent power output properties at a low temperature.

Hence, in order to prevent deterioration of low-temperature performance of the battery while maintaining the constitution of the conventional non-aqueous electrolyte showing stable battery properties at both room temperature and high temperature, research and study toward addition of a separate material to the electrolyte are required. In addition, in order to improve the low-temperature performance of the battery, it is preferred to make an effort toward prevention of increases in the resistance of the battery at a low temperature and prevention of the accompanying deterioration of power output properties.

As to improvement of the low-temperature properties of the secondary battery or capacitor, Japanese Patent Laid-open Publication No. 2001-85058 suggests the use of fluorinated solvents having an asymmetric structure such as $HCF_2(CF_2)_3COOEt$, $HCF_2(CF_2)_3CH_2I$, $FC(CF_3)_2(CF_2)_4(CF_3)_2CF$, $H(CF_2)_2OCH_3$ and the like. However, these solvents suffer from fundamental limitations in application thereof to mass production of the secondary battery, due to very high production costs, and a low dissociation degree of lithium ions, due to a small polarity as compared to carbonate-based solvents.

Therefore, there is also a need in the art for the development of a fabrication technique of the secondary battery which is capable of exerting superior operation performance, simultaneously with realization of low production costs.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that when a lithium secondary battery is fabricated by selective addition of a certain salt having a bulky structure to an electrolyte for a lithium secondary battery, low-temperature properties of the battery are improved by increasing the lithium ion-electrode reactivity and decreasing the electrode-interface resistance, via the formation of a charge double layer at the cathode-anode interface upon charging/discharging of the battery at a low temperature. The present invention has been completed based on these findings.

More specifically, the present invention provides an electrolyte for a lithium secondary battery which exhibits excellent low-temperature properties and is thereby capable of providing excellent properties even when it is used under severe conditions, particularly at low temperatures, such as in electric vehicles (EVs) and hybrid electric vehicles (HEVs).

DETAILED DESCRIPTION OF PREFERRED EMBODIMENTS

In accordance with an aspect of the present invention, the above and other objects can be accomplished by the provision of a lithium salt-containing non-aqueous electrolyte for a lithium secondary battery using a lithium manganese metal oxide as a cathode active material and a non-graphitic carbon material as an anode active material, the electrolyte containing a salt represented by Formula I below in an amount of 0.1 to 20% by weight, based on the total weight of the electrolyte:

$$R_4X^+YZ_n^- \qquad (I)$$

wherein:
R is a $C_3$-$C_{10}$ alkyl;
X is nitrogen or phosphorus;
Y is boron or phosphorus;
X and Y are not identical;
Z is a $C_3$-$C_{10}$ alkyl, a $C_4$-$C_{10}$ cyclic or aromatic group, or a halogen; and
n is 4 or 6, and is determined by an oxidation number of Y depending upon selection of X and Y.

In the lithium secondary battery utilizing the electrolyte of the present invention, use of the lithium manganese metal oxide as a cathode active material makes a contribution to improvement of the battery safety. Examples of the lithium manganese metal oxide may include lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium manganese composite oxides of Formula $LiMn_{2-x}M_xO_2$ (M=Co, Ni, Fe, Cr, Zn, Ta or any combination thereof, and $0.01 \leq x \leq 0.1$), or Formula $Li_2Mn_3MO_8$ (M=Fe, Co, Ni, Cu, Zn or any combination thereof); and $LiMn_2O_4$ wherein a portion of Li is substituted with alkaline earth metal ions. Among them, $LiMn_2O_4$, $LiNi_{0.5}Mn_{0.5}O_2$ or $LiNi_{1/3}Mn_{1/3}CO_{1/3}O_2$ is more preferable, and $LiNi_{1/3}Mn_{1/3}Co_{1/3}O_2$ is particularly preferable in terms of the battery durability (calendar life characteristics).

As mentioned above, the present invention employs a non-graphitic carbon material as the anode active material. The non-graphitic carbon material enables use of propylene carbonate (PC) exhibiting a relatively low viscosity at a low temperature while having a high dielectric constant as an electrolyte solvent.

Kinds of the carbon materials, utilized as the anode active material in the lithium secondary battery, are classified into soft carbon having a layered crystal structure of highly graphitized carbon (graphene structure: planar layers of carbon atoms arranged in hexagonal honeycomb), and hard carbon having a mixed structure of such a layered crystal structure and an amorphous structure. In addition, carbon having a completely layered crystal structure such as natural graphite is also separately classified as graphite. That is, kinds of the carbon materials as the anode active material may be broadly divided into graphite, soft carbon and hard carbon.

As used herein, the term "non-graphitic carbon material" refers generally to the case of carbon material that contains more than 50% of the non-graphitic carbon material and therefore cannot be regarded as the graphitic carbon material. Therefore, the anode material of the present invention includes an anode material in which less than 50% of the graphitic carbon material is mixed.

In one preferred embodiment, the non-graphitic carbon material may be an anode material containing more than 50% of hard carbon, on the basis of a weight ratio.

Due to characteristics of the above-mentioned carbon materials as the anode active material, the lithium secondary battery involving the graphite and soft carbon largely employs ethylene carbonate (EC) as an electrolyte solvent. Whereas, the non-graphitic carbon may employ propylene carbonate (PC) as an electrolyte solvent. According to the experiments conducted by the inventors of the present application, it was confirmed that propylene carbonate (PC) is preferably used as a material of batteries requiring the operation thereof at a low temperature, due to a lower freezing point as compared to that of ethylene carbonate (EC).

Where appropriate, in order to increase a conductivity of lithium ions and secure a reaction stability, a mixed solvent containing linear carbonates such as diethyl carbonate (DEC), dimethyl carbonate (DMC) and the like may also be used, in addition to PC.

The salt of Formula I, which is mixed in a lithium salt-containing non-aqueous electrolyte, is a compound which exhibits a high dissociation degree in the electrolyte solvent and no reactivity of dissociated cations and anions with the cathode and anode within the lithium battery and is capable of forming a charge double layer at the interface between the cathode and the anode. That is, the compound of Formula I is capable of improving low-temperature properties of the battery by increasing the lithium ion-electrode reactivity and consequently decreasing the electrode-interface resistance and thus improving power output performance, via the formation of a charge double layer at the cathode-anode interface upon charging/discharging of the battery at a low temperature. According to the experiments conducted by the inventors of the present application, it was confirmed that use of the compound of Formula I provides more than about 40% decrease of internal battery resistance and more than 40% increase of power output at a low temperature of −20 to −30° C., as compared to conventional lithium secondary batteries.

In Formula I, R is preferably a $C_3$-$C_{10}$ alkyl, more preferably butyl.

As particularly preferred examples of the salts of Formula I, mention may be made of $(C_4H_9)_4NB(C_4H_9)_4$, $(C_4H_9)_4NBF_4$, $(C_4H_9)_4NB(C_6H_5)_4$, $(C_4H_9)_4NPF_6$, $(C_4H_9)_4PBF_4$ and any combination thereof.

The salt of Formula I is preferably added in an amount of 0.1 to 20% by weight, based on the total weight of the electrolyte. If the content of the salt is excessively low, it is difficult to obtain desired effects of adding the salt. Conversely, if the content of the salt is excessively high, this may undesirably lead to problems such as an increased viscosity of the electrolyte and an increased internal resistance of the battery.

A given amount of the lithium salt is added to the lithium salt-containing non-aqueous electrolyte. Examples of the lithium salt that can be used in the present invention include, but are not limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte.

In accordance with another aspect of the present invention, there is provided a lithium secondary battery comprising the above-mentioned electrolyte. The lithium secondary battery is generally comprised of a cathode, an anode, a separator and a lithium salt-containing non-aqueous electrolyte.

The cathode is fabricated by applying a mixture of the above-mentioned lithium manganese metal oxide as a cathode active material, a conductive material and a binder to a cathode current collector. If desired, a filler may be further added to the mixture.

The cathode current collector is generally fabricated to have a thickness of 3 to 500 μm. There is no particular limit to materials for the cathode current collector, so long as they have high conductivity without causing chemical changes in the fabricated battery. As examples of materials for the cathode current collector, mention may be made of stainless steel, aluminum, nickel, titanium, sintered carbon, and aluminum or stainless steel which was surface-treated with carbon, nickel, titanium or silver. The cathode current collector may be fabricated to have fine irregularities on the surface thereof so as to enhance adhesive strength to the cathode active material. In addition, the cathode current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying the non-graphitic carbon material as mentioned hereinbefore to the anode current collector, followed by drying. Similar to the cathode mix, other components including the conductive material, binder and filler as described above may be further included, if necessary.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesive strength to the anode active material. In addition, the anode current collector may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

As the lithium salt-containing non-aqueous electrolyte, solid electrolyte, inorganic solid electrolyte or the like may be utilized.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

The lithium secondary battery according to the present invention may be preferably used as a unit cell for high power, large-capacity batteries or battery packs, particularly as power sources for vehicles such as electric vehicles (EVs) and hybrid electric vehicles (HEVs) requiring high power output even under low temperature conditions.

EXAMPLES

Now, the present invention will be described in more detail with reference to the following Examples. These examples are provided only for illustrating the present invention and should not be construed as limiting the scope and spirit of the present invention.

Example 1

LiNi$_{1/3}$Mn$_{1/3}$Co$_{1/3}$O$_2$ as a cathode active material, Super-P as a conductive material and polyvinylidene fluoride (PVDF) as a binder in a weight ratio of 85:10:5 were mixed in a solvent (N-methylpyrrolidone) to prepare a slurry. The resulting slurry was uniformly applied to aluminum foil, dried in a convection oven at 130° C., and pressed under predetermined pressure to fabricate a cathode.

Amorphous carbon as an anode active material and polyvinylidene fluoride (PVDF) as a binder in a weight ratio of 95:5 were mixed in a solvent (N-methylpyrrolidone) to prepare a slurry. The resulting slurry was uniformly applied to copper foil, dried in a convection oven at 130° C., and pressed under predetermined pressure to fabricate an anode.

A lithium salt-containing non-aqueous electrolyte was prepared by adding 1M LiPF$_6$ to a mixed solvent of PC/DMC (volume ratio=70:30), followed by addition of 3% by weight of (C$_4$H$_9$)$_4$NB(C$_4$H$_9$)$_4$, based on the total weight of the electrolyte.

Then, a porous polyethylene film (Celgard™) as a separator was interposed between the anode and cathode prepared as above, and the above-prepared lithium salt-containing non-aqueous electrolyte was added to the resulting electrode assembly in a dry box under argon atmosphere, thereby fabricating a lithium-ion polymer battery.

Example 2

A lithium-ion polymer battery was fabricated in the same manner as in Example 1, except that 2% by weight of (C$_4$H$_9$)$_4$NB(C$_4$H$_9$)$_4$ was added to an electrolyte.

Example 3

A lithium-ion polymer battery was fabricated in the same manner as in Example 1, except that 1% by weight of (C$_4$H$_9$)$_4$NB(C$_4$H$_9$)$_4$ was added to an electrolyte.

Example 4

A lithium-ion polymer battery was fabricated in the same manner as in Example 1, except that an equal amount of (C$_4$H$_9$)$_4$NB(C$_6$H$_5$)$_4$ was added to an electrolyte, instead of (C$_4$H$_9$)$_4$NB(C$_4$H$_9$)$_4$.

Comparative Example 1

A lithium-ion polymer battery was fabricated in the same manner as in Example 1, except that (C$_4$H$_9$)$_4$NB(C$_4$H$_9$)$_4$ was not added to an electrolyte.

Comparative Example 2

A lithium-ion polymer battery was fabricated in the same manner as in Example 1, except that natural graphite as an anode active material was used, instead of amorphous carbon.

Comparative Example 3

A lithium-ion polymer battery was fabricated in the same manner as in Example 1, except that (C$_2$H$_5$)$_4$N(C$_4$H$_9$)$_4$ was added to an electrolyte, instead of (C$_4$H$_9$)$_4$NB(C$_4$H$_9$)$_4$.

Experimental Example 1

Power output of the battery at −20° C. was measured for batteries fabricated in Examples 1 to 4 and Comparative Examples 1 to 3. The thus-obtained results are set forth in Table 1 below, by taking the power output of the battery of Comparative Example 1 as a value of 100%.

TABLE 1

| Example No. | Power output at low temperature | Example No. | Power output at low temperature |
|---|---|---|---|
| Ex. 1 | 113% | Comp. Ex. 1 | 100% |
| Ex. 2 | 110% | Comp. Ex. 2 | 88% |
| Ex. 3 | 108% | Comp. Ex. 3 | 103% |
| Ex. 4 | 107% | — | — |

As can be seen from Table 1, batteries of Examples 1 to 4 according to the present invention exhibited superior power output at a low temperature, as compared to the battery of Comparative Example 1 to which no salt was added.

In addition, as compared to the battery of Example 2 using amorphous carbon, the battery of Comparative Example 2 using natural graphite as the anode active material exhibited lower low-temperature properties, despite addition of the salt according to the present invention.

Further, the battery of Comparative Example 3 using (C$_2$H$_5$)$_4$NB(C$_4$H$_9$)$_4$ salt having non-bulky substituents exhibited a significant difference in low-temperature properties at the same content of the salt, as compared to the battery of Example 1.

INDUSTRIAL APPLICABILITY

As apparent from the above description, a lithium secondary battery according to the present invention can improve low-temperature properties of the battery by increasing the lithium ion-electrode reactivity and decreasing the electrode-interface resistance, via the formation of a charge double layer at the cathode-anode interface upon charging/discharging of the battery at a low temperature, and therefore can be preferably used in medium/large battery systems such as power sources for electric vehicles (EVs) and hybrid electric vehicles (HEVs) forced to be in operation under severe conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising a lithium manganese metal oxide as a cathode active material, a non-graphitic carbon material as an anode active material, and a lithium salt-containing non-aqueous electrolyte wherein the electrolyte contains as an additive a salt represented by Formula I in an amount of 0.1 to 20% by weight, based on the total weight of the electrolyte:

$$R_4X^+YZ_n^- \qquad (I)$$

wherein:
R is a C$_3$-C$_{10}$ alkyl;
X is nitrogen or phosphorus;
Y is boron or phosphorus;
X and Y are not identical;
Z is a C$_3$-C$_{10}$ alkyl, or C$_4$-C$_{10}$ cyclic or aromatic group; and n is 4 or 6, and is determined by an oxidation number of Y depending upon selection of X and Y; and wherein propylene carbonate or a mixed solvent of propylene carbonate and a linear carbonate is used as a solvent of the electrolyte.

2. The lithium secondary battery according to claim 1, wherein the lithium manganese metal oxide is a lithium manganese oxide of the Formula $Li_{1+x}Mn_{2-x}O_4$ ($0 \leq x \leq 0.33$), $LiMnO_3$, $LiMn_2O_3$ or $LiMnO_2$; a lithium manganese composite oxide of the Formula $LiMn_{2-x}M_xO_2$ (M=Co, Ni, Fe, Cr, Zn, Ta or any combination thereof, and $0.01 \leq x \leq 0.1$), or the Formula $Li_2Mn_3MO_8$ (M=Fe, Co, Ni, Cu, Zn or any combination thereof); or $LiMn_2O_4$ wherein a portion of Li is substituted with alkaline earth metal ions.

3. The lithium secondary battery according to claim 1, wherein the lithium manganese metal oxide is $LiMn_2O_4$, $LiNi_{0.5}Mn_{0.5}O_2$ or $LiNi_{1/3}Mn_{1/3}Co_{1/3}O_2$.

4. The lithium secondary battery according to claim 3, wherein the lithium manganese metal oxide is $LiNi_{1/3}Mn_{1/3}Co_{1/3}O_2$.

5. The lithium secondary battery according to claim 1, wherein the non-graphitic carbon material is hard carbon.

6. The lithium secondary battery according to claim 1, wherein R of Formula I is butyl.

7. The lithium secondary battery according to claim 1, wherein the salt of Formula I is selected from the group consisting of $(C_4H_9)_4NB(C_4H_9)_4$, $(C_4H_9)_4NB(C_6H_5)_4$, and any combination thereof.

8. The lithium secondary battery according to claim 1, wherein the battery is used as a unit cell for a high power, large-capacity battery or battery pack.

9. The lithium secondary battery according to claim 8, wherein the battery is used as a power source for an electric vehicle (EV) or a hybrid electric vehicle (HEV).

* * * * *